United States Patent
Ponnappan et al.

[11] Patent Number: 5,283,488
[45] Date of Patent: Feb. 1, 1994

[54] ROTOR COOLING STRUCTURE

[75] Inventors: Rengasamy Ponnappan, Dayton; Jerry E. Beam, Beavercreek, both of Ohio

[73] Assignee: The United States of America as represented by the Secretary of the Air Force, Washington, D.C.

[21] Appl. No.: 20,930

[22] Filed: Feb. 22, 1993

[51] Int. Cl.$^5$ .............................................. H02k 9/00
[52] U.S. Cl. .......................................... 310/55; 310/54
[58] Field of Search ................. 310/52, 54, 55, 61, 310/64, 57, 58, 68; 165/104.19, 104.33, 910

[56] References Cited

U.S. PATENT DOCUMENTS

| | | | |
|---|---|---|---|
| 3,765,480 | 10/1993 | Fries | 310/54 |
| 3,842,596 | 10/1974 | Gray | 165/105 |
| 3,914,630 | 10/1975 | Lloyd et al. | 310/61 |
| 4,295,067 | 10/1981 | Binder et al. | 310/52 |
| 4,418,295 | 11/1983 | Shiga | 310/59 |
| 4,702,682 | 10/1987 | Inaba et al. | 418/55 |
| 4,739,204 | 4/1988 | Kitamura et al. | 310/68 D |
| 4,740,711 | 4/1988 | Sato et al. | 290/54 |
| 4,929,414 | 5/1990 | Leonard et al. | 165/104.27 |
| 4,980,588 | 12/1990 | Ogawa | 370/68 D |
| 5,140,204 | 8/1992 | Cashmore et al. | 310/61 |

*Primary Examiner*—Steven L. Stephan
*Assistant Examiner*—Matthew Nguyen
*Attorney, Agent, or Firm*—Bobby D. Scearce; Thomas L. Kundert

[57] ABSTRACT

A rotor structure for an electrical generator, motor or the like is described which comprises a rotatable generally cylindrically shaped heat pipe defining an internal vapor chamber having an evaporator end and a condenser end, a plurality of radial fins regularly spaced on the periphery of the heat pipe, each fin defining an internal chamber communicating with and extending radially from the vapor chamber, a vaporizable liquid disposed within said heat pipe, and a heat exchanger in thermal contact with the condenser end of the heat pipe.

9 Claims, 1 Drawing Sheet

ROTOR COOLING STRUCTURE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to cooling systems for electrical machinery and more particularly to a rotating heat pipe rotor structure for cooling rotors in electric generators, motors or the like.

Electrical systems in military and commercial aircraft typically include electrical power generators having permanent magnet rotors which generate heat during operation as a result of eddy current and hysteresis losses. Because the temperature difference between the core of the rotor and its peripheral surfaces may be large (about 150° C.), rotor cooling may be required to attain a desirable level of operating efficiency.

Existing cooling methods include convective air or oil circulation through a passageway defined through the rotor shaft. Bleed air from the aircraft engine compressor is not effective as coolant because of poor heat transfer and low heat capacity associated with air, and use of bleed air may reduce overall engine performance. Oil circulation causes viscous frictional loss for the rotor which reduces overall efficiency. Oil jet cooling is not efficient because of poor thermal contact between the drive shaft and rotor.

The invention solves or substantially reduces in critical importance problems with prior art rotor cooling structures by providing a rotor structure comprising a rotatable heat pipe having a plurality of fins defining radially extending vapor chambers in the evaporator end of the heat pipe for absorbing waste heat from the rotor core by vaporization of the heat pipe working fluid and removing heat at a heat exchanger in thermal contact with the condenser end of the heat pipe. The finned multi-chamber evaporator structure of the invention provides substantially improved and uniform cooling of the rotor core as compared to prior art structures. Problems with high differential temperatures and thermal stress within the rotor core are substantially eliminated.

Efficient rotor cooling may prevent overheating and premature failure, and thus may improve reliability and maintainability, of the electrical generators or motors incorporating the invention. Use of the invention on an aircraft may result in overall weight reduction of aircraft systems. Utility of the invention may also be found in ground based electrical machinery such as ground carts, portable generators, environmental control equipment and lightweight motors for electrical transportation.

It is therefore a principal object of the invention to provide a structure for cooling rotors in high power electric generators, motors or the like.

It is another object of the invention to provide a structure for cooling rotors in electric generators, motors or the like utilizing a rotatable heat pipe structure.

It is another object of the invention to provide a rotatable heat pipe structure for cooling rotors in electrical equipment aboard aircraft.

It is a further object of the invention to provide a rotatable heat pipe structure for cooling rotors in electrical machinery to improve power density or power-to-weight ratio thereof.

It is a further object of the invention to provide a rotor structure for low temperature operating electrical machinery.

These and other objects of the invention will become apparent as a detailed description of representative embodiments proceeds.

SUMMARY OF THE INVENTION

In accordance with the foregoing principles and objects of the invention, a rotor structure for an electrical generator, motor or the like is described which comprises a rotatable generally cylindrically shaped heat pipe defining an internal vapor chamber having an evaporator end and a condenser end, a plurality of radial fins regularly spaced on the periphery of the heat pipe, each fin defining an internal chamber communicating with and extending radially from the vapor chamber, a vaporizable liquid disposed within said heat pipe, and a heat exchanger in thermal contact with, the condenser end of the heat pipe.

DESCRIPTION OF THE DRAWINGS

The invention will be more clearly understood from the following detailed description of representative embodiments thereof read in conjunction with the accompanying drawings wherein.

DETAILED DESCRIPTION

Figure 2:
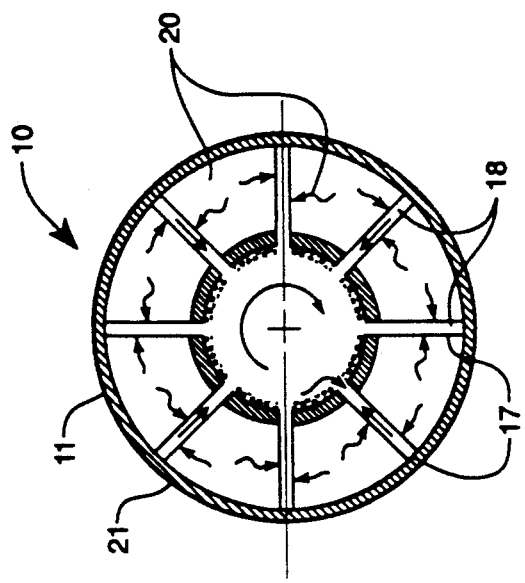
FIG. 2 is a view of the FIG. 1 structure taken along line A—A.
Figure 1:
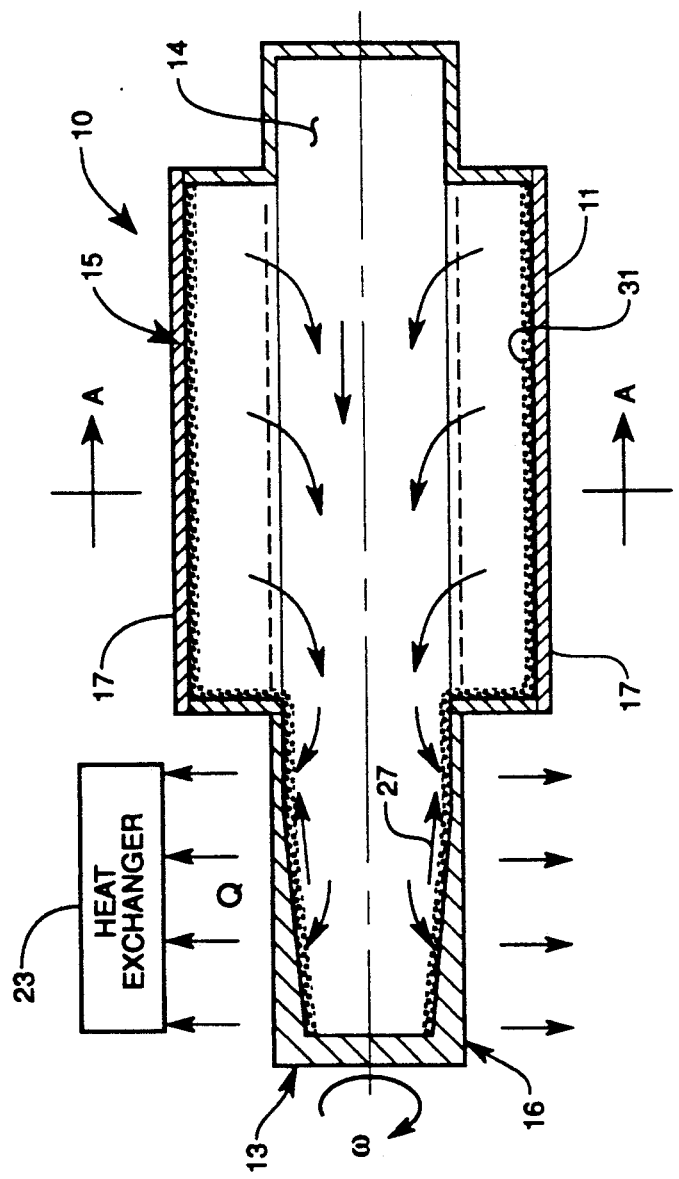
FIG. 1 is a view in axial section of a coolant rotor structure representative of the invention.

Referring now to the drawings, FIG. 1 shows a view in axial section of a representative rotor structure 10 of the invention. FIG. 2 is a view of structure 10 taken along line A—A of FIG. 1. In the rotor structure defined by the invention herein and exemplified by representative structure 10 shown in FIGS. 1 and 2, rotor 11 comprises a rotatable, generally cylindrically shaped, heat pipe 13 defining an internal vapor chamber 14 having evaporator end 15 and condenser end 16. The heat pipe 13 structure itself is the torque transmitting element of the electrical generator or motor structure (not shown) within which rotor 11 rotates and, accordingly, comprises structural material of strength and thermal conductivity sufficient for the intended purpose. Heat pipe 13 typically comprises a non-magnetic structural material such as copper, stainless steel 300 series, molybdenum, Inconel or other material as would occur to the skilled artisan guided by these teachings. In an alternative structure not shown in the drawings, the rotor structure may comprise a solid torque transmitting rotor drive shaft surrounded by an annularly shaped vapor chamber.

Evaporator end 15 of heat pipe 13 comprises a plurality of radial fins 17 regularly spaced on the periphery of heat pipe 13, each fin 17 defining an internal chamber 18 communicating with and extending radially from vapor chamber 14. Fins 17 may be axially extending as shown in FIGS. 1 and 2, or in an alternative structure contemplated herein may comprise axially spaced annular fins (not shown). Any suitable plurality of fins 17 may be included in the heat pipe 13 structure shown in FIGS. 1, 2 consistent with a resultant dynamically balanced structure, such as two diametrically disposed fins, three at 120°, four in quadrature or other suitable plurality, including the eight fins shown in FIG. 2. Between adjacent fins 17 are disposed suitably shaped and sized pole pieces and permanent magnet segments 20 comprising samarium-cobalt, Permendur or other magnetic material normally comprising the rotor of a motor or generator. Heat generated within segments 20 during electrical operation is removed and dissipated by the heat pipe 13 rotor structure of the invention. Cylindrical outer housing member 21 of suitable non-magnetic material may be included to retain segments 20 and to provide structural integrity to rotor 11.

Condenser end 16 is disposed in thermal contact with a heat exchanger 23 or is otherwise cooled. In an alternative embodiment of the invention, a second condenser (not shown) may be included to enhance heat removal. Removal of heat Q from condenser end 16 may usually be accomplished through various means (not shown) such as air cooling, circulating oil, oil spray and conduction. The internal surface of condenser end 16 may preferably be tapered as suggested in FIG. 1 to promote flow of the heat pipe working fluid toward evaporator end 15 in the operation of heat pipe 13 described more fully below.

Suitable working fluid 27 for use within heat pipe 13 is selected according to the operating temperature of the generator or motor for which rotor 11 is configured. Representative fluids and corresponding operating temperature ranges suitable for use within heat pipe 13 include, but are not considered limited to, water (40° to 200° C.), ethyl alcohol ($-20°$ to 130° C.), acetone ($-40°$ to 140° C.), mercury (150° to 500° C.), potassium (350° to 750° C.) or DOW-THERM-A (The Dow Chemical Company, Moorestown N.J.) (100° to 450° C.); other fluids may be selected by one skilled in the art guided by these teachings considering the temperature range of operation and compatibility with heat pipe 13 structural materials. Required fluid 27 quantity is determined by the anticipated heat load and rotational speed $\omega$ of rotor 11.

In the operation of rotor 11, heat generated within segments 20 during normal electrical operation is conducted through the walls of fins 17 and vaporizes fluid 27 within chambers 18. The resulting vapor is displaced by liquid working fluid 27 (as by rotation of rotor 11) radially inwardly and flows to condenser end 16 where the vapor condenses to a liquid which then flows back toward fins 17 for vaporization at evaporator end 15.

Flow and even distribution of liquid toward evaporator end 15 may be enhanced by lining the walls defining vapor chamber 14 and chambers 18 with a porous wick 31 material. Wick 31 may comprise any suitable material compatible with the selected working fluid 27 as is customary for the purpose, such as wire mesh, felt, sinter metal, or machined grooves on the interior heat pipe 13 walls.

The invention therefore provides a rotatable heat pipe rotor structure for cooling rotors in high power electric generators, motors or the like. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A rotor structure for an electrical generator, motor or the like, comprising:
   (a) a rotatable, generally cylindrically shaped heat pipe defining an internal vapor chamber having an evaporator end and a condenser end;
   (b) means defining a plurality of radial fins regularly spaced on an outer surface of said heat pipe, each of said fins defining an internal chamber communicating with and extending radially from said vapor chamber;
   (c) a vaporizable liquid disposed within said heat pipe; and
   (d) heat removal means disposed in heat exchange relationship with said condenser end of said heat pipe.

2. The rotor structure of claim 1 wherein said radial fins extend axially of said outer surface of said heat pipe.

3. The rotor structure of claim 1 wherein said heat pipe comprises a non-magnetic material selected from the group consisting of copper, a series 300 stainless steel, molybdenum and Inconel.

4. The rotor structure of claim 1 further comprising a plurality of permanent magnet segments disposed on said outer surface of said heat pipe between adjacent said fins.

5. The rotor structure of claim 4 wherein said permanent magnet segments comprise a material selected from the group consisting of samarium-cobalt and Permendur.

6. The rotor structure of claim 1 wherein said heat removal means includes one of air cooling, liquid coolant circulation, coolant spray and conduction.

7. The rotor structure of claim 1 wherein said vaporizable liquid is selected from the group consisting of water, ethyl alcohol, acetone, mercury, potassium and Dowtherm-A.

8. The rotor structure of claim 1 further comprising wicking means within said vapor chamber and each said internal chamber for facilitating flow of said vaporizable liquid toward said evaporator end of said heat pipe.

9. The rotor structure of claim 8 wherein said wicking means is selected from the group consisting of wire mesh, felt, sinter metals and machined grooves.

* * * * *